(12) United States Patent
Sakata et al.

(10) Patent No.: US 8,153,720 B2
(45) Date of Patent: Apr. 10, 2012

(54) RESIN COMPOSITION

(75) Inventors: Minoru Sakata, Tokyo (JP); Yoshikuni Akiyama, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 11/976,425

(22) Filed: Oct. 24, 2007

(65) Prior Publication Data

US 2008/0081867 A1    Apr. 3, 2008

(30) Foreign Application Priority Data

Apr. 12, 2005 (JP) ................. 2005-114347

(51) Int. Cl.
- C08J 3/22 (2006.01)
- C08K 3/34 (2006.01)
- C08F 283/08 (2006.01)
- C08L 73/00 (2006.01)

(52) U.S. Cl. ........................ 524/451; 524/508
(58) Field of Classification Search .................. 524/451, 524/508
See application file for complete search history.

(56) References Cited

U.S. PATENT DOCUMENTS

| | | | | |
|---|---|---|---|---|
| 5,082,888 A * | 1/1992 | Abe et al. | ....................... | 524/449 |
| 7,173,090 B2 * | 2/2007 | Akiyama et al. | ................. | 525/88 |

FOREIGN PATENT DOCUMENTS

| | | | |
|---|---|---|---|
| JP | 1-213359 | A | 8/1989 |
| JP | 9-157525 | A | 6/1997 |
| JP | 11-106655 | A | 4/1999 |
| JP | 11-158374 | A | 6/1999 |
| JP | 2000001688 | A * | 1/2000 |
| JP | 2001-294751 | A | 10/2001 |
| JP | 2001-302916 | A | 10/2001 |
| JP | 2002-69298 | A | 3/2002 |
| JP | 2002-179915 | A | 6/2002 |
| WO | WO 03035760 | A2 * | 5/2003 |
| WO | WO 2006067902 | A1 * | 6/2006 |

* cited by examiner

*Primary Examiner* — Mark Eashoo
*Assistant Examiner* — Angela C Scott
(74) *Attorney, Agent, or Firm* — Birch, Stewart, Kolasch & Birch, LLP

(57) ABSTRACT

It is intended to provide a polymer alloy including a polyphenylene sulfide resin, a polyphenylene ether resin, and a talc, which is excellent in a balance between tenacity (impact strength) and rigidity and in die wear resistance. The present invention provides a resin composition including 45 to 99 parts by weight of a polyphenylene sulfide resin (a), 55 to 1 part(s) by weight of a polyphenylene ether resin (b), 1 to 20 part(s) by weight of a compatibilizer (c) with respect to 100 parts by weight in total of the components (a) and (b), and 20 to 200 parts by weight of a talc (d) having an average particle size of 25 to 100 μm or 20 to 200 parts by weight in total of a talc (d) having an average particle size of 25 to 100 μm and a fibrous filler (e) with respect to 100 parts by weight in total of the components (a) and (b).

13 Claims, No Drawings

RESIN COMPOSITION

BACKGROUND OF THE INVENTION (1) Field of the Invention

The present invention relates to a resin composition excellent in a balance between tenacity (impact strength) and rigidity and in die wear resistance, which is available in a mechanical component for an optical instrument, a peripheral component for a light source lamp, an optical fiber connector ferrule, a printer component, a copy machine component, an automobile lamp component, an automobile radiator tank component, or an internal component of an automobile engine room, etc.

(2) Description of Related Art

Polyphenylene sulfide resins are classified into two groups, linear polyphenylene sulfide resins and cross-linked (including semi-cross-linked) polyphenylene sulfide resins, according to production methods thereof. The latter cross-linked polyphenylene sulfide resins are thermoplastic resins with a polymer molecular weight and a viscosity appropriately increased by polymerizing the former linear polyphenylene sulfide resins and then further heating the polymerization products in the presence of oxygen at a temperature equal to or lower than the melting point of the polyphenylene sulfide resins to promote oxidative cross-linking. These cross-linked polyphenylene sulfide resins are superior in mechanical strength and heat resistance to the linear polyphenylene sulfide resins and however, have the disadvantage of being inferior in tenacity thereto.

On the other hand, the linear polyphenylene sulfide resins, which are excellent in tenacity, have limitations of polymerization techniques, that is, the molecular chain length of these linear forms is difficult to increase. Therefore, the linear polyphenylene sulfide resins cannot be expected to achieve improved mechanical strength and heat resistance. Furthermore, they have the problem that molding burrs easily occur during molding.

Particularly, both types of the polyphenylene sulfide resins have been known in the art as resins in which molding burrs more easily occur than in non-crystalline thermoplastic resins, though the linear and cross-linked forms somewhat differ in the extent of easy occurrence of molding burrs.

Among others, a mechanical component for an optical instrument such as an optical pickup base installed in a compact disc or an optical system housing for a copy machine has been produced by, for example, metal die-casting using aluminum, zinc or the like. In recent years, progress has been made toward a changeover to a mechanical component made of resins, from the viewpoint of weight reduction and improvement in productivity. For this changeover to a mechanical component made of resins, materials have been demanded to have heat resistance as resin molded products, high dimensional accuracy associated with thermal changes, reduced molding burrs occurring during molding, and reduced die abrasion.

Therefore, a number of proposals to modify and devise materials have been made on a polyphenylene sulfide resin composition that serves as a raw material for molded products used in these applications. A number of proposals of techniques for preparing a polymer alloy from a polyphenylene sulfide resin as a crystalline resin by use of a polyphenylene ether resin as a non-crystalline resin have been made as techniques for suppressing the occurrence of molding burrs, which is a major challenge to molding.

A resin composition excellent in rigidity and dimensional accuracy with reduced burrs occurring during molding has been proposed as these techniques, which is obtained by formulating a particular inorganic compound, a fibrous filler, and other inorganic fillers into a resin component comprising polyphenylene sulfide and polyphenylene ether (see e.g., JP-A-9-157525 and JP-A-11-106655).

Alternatively, to obtain similar effects, a resin composition has been proposed, which comprises a resin component comprising polyphenylene sulfide and polyphenylene ether as well as a silane coupling agent, a fibrous filler, and other inorganic fillers (see e.g., JP-A-11-158374 and JP-A-2002-69298). To obtain a resin composition with reduced optical axis misalignment as an optical component (see e.g., JP-A-2001-294751), a resin composition has been proposed, which comprises polyphenylene sulfide and polyphenylene ether used at a specified volume fraction as well as an inorganic filler.

Alternatively, to reduce the occurrence of burrs during injection molding, a resin composition has been proposed, which comprises polyphenylene sulfide, polyphenylene ether, and a glass fiber at a specified proportion of each component (see e.g., JP-A-2002-179915).

In this context, the present applicant has proposed a resin composition using a particular compatibilizer as a material for a polymer alloy of a polyphenylene sulfide resin and a polyphenylene ether resin (see e.g., JP-A-1-213359 and JP-A-2001-302916).

The compositions described in these documents are obtained by formulating a variety of inorganic fillers into a base resin component comprising polyphenylene sulfide and polyphenylene ether. As a result, these compositions can overcome the disadvantages of resins to improve dimensional accuracy depending on temperature changes or suppress the occurrence of burrs during molding. However, improvement in tenacity (impact strength), rigidity, and die wear resistance is still insufficient under these circumstances.

An object of the present invention is to provide a resin composition excellent in a balance between tenacity (impact strength) and rigidity and in die wear resistance, which is a polymer alloy comprising a polyphenylene sulfide resin and a polyphenylene ether resin and being used as a precision molded product such as a mechanical component for an optical instrument, a peripheral component for a light source lamp, an optical fiber connector ferrule, a printer component, a copy machine component, an automobile lamp component, an automobile radiator tank component, or an internal component of an automobile engine room.

BRIEF SUMMARY OF THE INVENTION

To attain the object, the present inventors have conducted diligent studies on a talc contained in a resin composition comprising a polyphenylene sulfide resin and a polyphenylene ether resin and has consequently completed the present invention by finding out that the use of a particular talc produces a resin composition excellent in a balance between tenacity (impact strength) and rigidity and in die wear resistance.

Specifically, the present invention provides:

[1] a resin composition comprising 45 to 99 parts by weight of a polyphenylene sulfide resin (a), 55 to 1 part(s) by weight of a polyphenylene ether resin (b), 1 to 20 part(s) by weight of a compatibilizer (c) with respect to 100 parts by weight in total of the components (a) and (b), and 20 to 200 parts by weight of a talc (d) having an average particle size of 25 to 100 μm or 20 to 200 parts by weight in total of a talc (d) having an average particle size of 25 to 100 μm and a fibrous filler (e) with respect to 100 parts by weight in total of the components (a) and (b);

[2] the resin composition according to [1], wherein the talc having an average particle size of 25 to 100 μm as the component (d) is a talc containing 70% or more of particles having a size of 10 μm or larger;

[3] the resin composition according to any one of [1] to [2], wherein the polyphenylene sulfide resin as the component (a) is a linear polyphenylene sulfide resin (a-1) and/or a cross-linked polyphenylene sulfide resin (a-2);

[4] the resin composition according to any one of [1] to [3], wherein the polyphenylene sulfide resin as the component (a) comprises 1 to 96% by weight of the linear polyphenylene sulfide resin (a-1) and 99 to 4% by weight of the cross-linked polyphenylene sulfide resin (a-2);

[5] the resin composition according to any one of [1] to [4], wherein the resin composition further comprises 5 to 30 parts by weight of an impact resistance-imparting agent (f) with respect to 100 parts by weight in total of the components (a) and (b);

[6] the resin composition according to any one of [1] to [5], wherein the polyphenylene sulfide resin as the component (a) has a melt viscosity of 1 to 10,000 poise;

[7] the resin composition according to any one of [1] to [6], wherein the linear polyphenylene sulfide resin as the component (a-1) has an extractability with methylene chloride of 0.7% by weight or lower and has 20 μmol/g or more of a —SX group, where S represents a sulfur atom, and X represents an alkali metal or hydrogen atom;

[8] the resin composition according to any one of [1] to [7], wherein the cross-linked polyphenylene sulfide resin as the component (a-2) has a volatile matter content of 1,000 ppm or lower collected in a melt state at 320° C.;

[9] the resin composition according to any one of [1] to [8], wherein the polyphenylene ether resin as the component (b) has any one component ratio of polyphenylene ether=100% by weight or polyphenylene ether/styrene resin=1 to 99% by weight/99 to 1% by weight;

[10] the resin composition according to any one of [1] to [9], wherein the compatibilizer as the component (c) is at least one member selected from the group consisting of a styrene-glycidyl methacrylate copolymer, a styrene-glycidyl methacrylate-methyl methacrylate copolymer, a styrene-glycidyl methacrylate-acrylonitrile copolymer, a styrene-vinyloxazoline copolymer, and a styrene-vinyloxazoline-acrylonitrile copolymer;

[11] the resin composition according to any one of [1] to [10], wherein the talc as the component (d) is a talc having an average particle size of 25 to 70 μm;

[12] the resin composition according to any one of [1] to [11], wherein the fibrous filler as the component (e) is at least one member selected from the group consisting of a glass fiber, a carbon fiber, a carbon nanotube, an alumina fiber, a silicon carbide fiber, a ceramic fiber, a gypsum fiber, a metal fiber, potassium titanate whisker, calcium carbonate whisker, and wollastonite;

[13] the resin composition according to any one of [1] to [12], wherein the impact resistance-imparting agent as the component (f) is at least one member selected from the group consisting of: a block copolymer obtained by copolymerizing a vinyl aromatic compound and a conjugated diene compound; a hydrogenated block copolymer obtained by further subjecting this block copolymer to hydrogenation reaction; a block copolymer comprising the block copolymer or the hydrogenated block copolymer and having at least one functional group selected from hydroxyl, carboxyl, acid anhydride, ester, epoxy, oxazolyl, and amino groups; an ethylene/α-olefin copolymer; and a copolymer comprising this ethylene/α-olefin copolymer and having at least one functional group selected from hydroxyl, carboxyl, acid anhydride, ester, epoxy, oxazolyl, and amino groups; and

[14] the resin composition according to any one of [1] to [13], wherein the resin composition is used in at least one molded component selected from a mechanical component for an optical instrument, a peripheral component for a light source lamp, an optical fiber connector ferrule, a printer component, a copy machine component, an automobile lamp component, an automobile radiator tank component, and an internal component of an automobile engine room.

The resin composition of the present invention, which comprises a polyphenylene sulfide resin and a polyphenylene ether resin, can be improved in a balance between tenacity (impact strength) and rigidity and in die wear resistance by using a talc having a particular particle size and is of great industrial value.

DETAILED DESCRIPTION OF THE INVENTION

Hereinafter, the present invention will be described in detail.

A resin composition of the present invention comprises a polyphenylene sulfide resin as a component (a), a polyphenylene ether resin as a component (b), a compatibilizer as a component (c), a talc having a particular particle size as a component (d), a fibrous filler (e), and an impact resistance-imparting agent (f), which will be shown below.

The polyphenylene sulfide resin as the component (a) used in the present invention can be selected for use from among polyphenylene sulfide resins classified into two groups, a linear polyphenylene sulfide resin (a-1) (hereinafter, abbreviated to linear PPS) and a cross-linked polyphenylene sulfide resin (a-2) according to the production method thereof. The linear PPS is a polymer that usually contains 50% by mole or higher, preferably 70% by mole or higher, more preferably 90% by mole or higher of an arylene sulfide repeating unit represented by the following general formula (Formula 1):

[—Ar—S—] (Formula 1)

wherein Ar represents an arylene group, and examples of the arylene group include a p-phenylene group, an m-phenylene group, a substituted phenylene group (a preferable substituent is an alkyl group having 1 to 10 carbon atom(s) or a phenyl group), a p,p'-diphenylene sulfone group, a p,p'-biphenylene group, a p,p'-diphenylenecarbonyl group, and a naphthylene group.

In this context, the linear PPS may be a homopolymer comprising one arylene group as a constituent unit or may be a copolymer obtained by using a mixture of two or more different arylene groups from the viewpoint of processability and heat resistance. Among others, a linear polyphenylene sulfide resin having p-phenylene sulfide repeating units as a main component is preferable in terms of excellent processability and heat resistance and industrially easy availability.

Examples of a method for producing this linear PPS usually include: a method comprising polymerizing a halogen-substituted aromatic compound, for example, p-dichlorobenzene, in the presence of sulfur and sodium carbonate; a method comprising polymerizing the halogen-substituted aromatic compound in the presence of sodium sulfide, sodium hydrogen sulfide and sodium hydroxide, hydrogen sulfide and sodium hydroxide, or sodium aminoalkanoate in a polar solvent; and the self-condensation of p-chlorothiophenol. Among others, an appropriate method comprises reacting sodium sulfide with p-dichlorobenzene in an amide solvent (e.g., N-methylpyrroridone or dimethylacetamide) or a sulfone solvent (e.g., sulfolane).

These production methods are known in the art. The linear PPS can be produced by, for example, methods described in U.S. Pat. No. 2,513,188, JP-B-44-27671, JP-B-45-3368, JP-B-52-12240, JP-A-61-225217, U.S. Pat. No. 3,274,165, JP-B-46-27255, Belgian Patent No. 29437, and JP-A-5-222196 or methods of prior arts illustrated in these patents.

A preferable linear PPS as the component (a-1) among linear PPSs is a linear polyphenylene sulfide resin that has an extractability with methylene chloride of 0.7% by weight or lower, preferably 0.5% by weight or lower, and has 20 µmol/g or more, preferably 20 to 60 µmol/g of a terminal —SX group (wherein S represents a sulfur atom, and X represents an alkali metal or hydrogen atom).

In this context, the extractability with methylene chloride can be measured as follows:

Specifically, 5 g of linear PPS powders is added to 80 ml of methylene chloride to perform Soxhlet extraction for 6 hours. Then, the solution is cooled to a room temperature. The methylene chloride solution after extraction is transferred to a weighing bottle. The container used in the extraction is further washed three times with a total of 60 ml of methylene chloride. The wash is collected into the weighing bottle. Next, the solution in the weighing bottle is heated to approximately 80° C. to remove methylene chloride in the weighing bottle by evaporation. The residue is weighed. From the amount of this residue, the extractability with methylene chloride, that is, an oligomer content in the linear PPS can be determined.

In this context, the —SX group can be quantified by the following method: linear PPS powders are dried in advance at 120° C. for 4 hours. Then, 20 g of the dried linear PPS powders is added to 150 g of N-methyl-2-pyrrolidone. The mixture is mixed by vigorous stirring at room temperature for 30 minutes so as to remove the power masses and prepared in a slurry state. This slurry is filtered and then washed seven times using 1 liter of hot water at approximately 80° C. each time. The filtered cake thus obtained is made into slurry again in 200 g of pure water. Subsequently, the slurry is adjusted to pH 4.5 by the addition of 1 N hydrochloric acid. Next, the resulting slurry is stirred at 25° C. for 30 minutes. The slurry is filtered and then washed six times using 1 liter of hot water at approximately 80° C. each time. The filtered cake thus obtained is made into slurry again in 200 g of pure water. Subsequently, titration is performed with 1 N sodium hydroxide. From the amount of sodium hydroxide consumed, the —SX group content in the linear PPS can be determined. In this context, specific examples of a method for producing linear PPS that satisfies an extractability with methylene chloride of 0.7% by weight or lower and a terminal —SX group content of 20 µmol/g or more include a method described in JP-A-8-253587 comprising reacting an alkali metal sulfide with a dihalo aromatic compound in an organic amide solvent, cooling a gas-phase portion in the reaction can during the reaction to thereby condensate a portion of the gas phase in the reaction can, and refluxing this gas-phase portion into an upper liquid layer of the reaction solution to thereby decrease the oligomer component.

The cross-linked (including semi-cross-linked) polyphenylene sulfide resin (hereinafter, abbreviated to cross-linked PPS) as the component (a-2) is a resin with a polymer molecular weight and a viscosity appropriately increased by polymerizing the linear polyphenylene sulfide resin as the component (a-1) and then further heating the polymerization product in the presence of an oxygen at a temperature equal to or lower than the melting point of the polyphenylene sulfide resin to promote oxidative cross-linking.

The most preferable cross-linked PPS as this component (a-2) among cross-linked PPSs is a cross-linked polyphenylene sulfide resin that has a volatile matter content of 1,000 ppm or lower collected in a melt state at 320° C., from the viewpoint of gas or rosin generation in the molding of the resin composition obtained in the present invention and from the viewpoint of mold release properties. In this context, the volatile matter content collected in a melt state at 320° C. can be quantified by the following method: 0.5 g of cross-linked PPS powders is weighed into a test tube with a stopper having an air current inlet and an air current outlet. The test tube is dipped for 30 minutes in a solder bath heated to 320° C., while a nitrogen gas is injected at a flow rate of 100 cc/min from the air current inlet of the test tube. A gas containing cross-linked PPS-derived volatile matters generated in the test tube is purged from the air current outlet of the test tube. The purged gas is captured through an air current inlet of an acetone-containing test tube with a stopper having an air current inlet and an air current outlet and bubbled in acetone in the test tube to dissolve the volatile components into acetone. The content of the volatile matters of the cross-linked PPS dissolved in acetone is quantified and determined with a gas-chromatograph-mass spectrometer (GC-MS) on the assumption that the whole component detected by analysis at a temperature risen from 50° C. to 290° C. has the same sensitivity as that of monochlorobenzene.

To obtain the cross-linked polyphenylene sulfide resin that has this volatile matter content of 1,000 ppm or lower collected in a melt state at 320° C., a polymer concentration and solvent composition are usually devised at a linear PPS polymerization stage; a washing method for collecting the polymer at a stage in which polymerization is completed is devised; or a temperature, time, and so on are changed in high-temperature treatment at a subsequent cross-linking stage. As a result, cross-linked PPS having the desired volatile matter content can be obtained.

Furthermore, these PPSs (linear and cross-linked PPSs) may be acid-denatured PPSs. In this context, the acid-denatured PPSs are obtained by denaturing the PPSs with an acid compound. Examples of the acid compound can include: unsaturated carboxylic acids such as acrylic acid, methacrylic acid, maleic acid, fumaric acid, and maleic anhydride; anhydrides thereof; saturated aliphatic carboxylic acids; and aromatically substituted carboxylic acids. Further examples of the acid compound can include organic acid compounds such as acetic acid and inorganic acid compounds such as hydrochloric acid, sulfuric acid, phosphoric acid, silicic acid, and carbonic acid.

Each of the linear PPS as the component (a-1) and the cross-linked PPS as the component (a-2) that can be used in the present invention has a melt viscosity of 1 to 10,000 poise, preferably 50 to 8,000 poise, more preferably 100 to 5,000 poise, at 300° C. In the present invention, the melt viscosity is a value determined by preheating PPS at 300° C. for 6 minutes and then measuring the melt viscosity with a flow tester (CFT-500 model manufactured by Shimadzu Corp.) under conditions involving a load of 196 N and die length (L)/die diameter (D)=10 mm/1 mm with reference to a JIS K-7210 test method.

Next, the polyphenylene ether resin as the component (b) of the present invention is a polyphenylene ether resin of a homopolymer and/or a copolymer comprising repeating units shown by the following binding unit (Formula 2) and having a number-average molecular weight of 1,000 or higher, preferably ranging from 1,500 to 50,000, more preferably ranging from 1,500 to 30,000, in terms of polystyrene measured with GPC (gel permeation chromatography) or is a mixture comprising this polyphenylene ether resin and a styrene resin at arbitrary proportions (hereinafter, abbreviated to PPE):

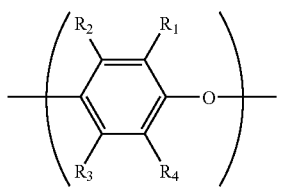

(Formula 2)

wherein R1, R2, R3, and R4 may be the same or different, and each of them is selected from the group consisting of hydrogen, halogen, a primary or secondary lower alkyl group having 1 to 7 carbon atom(s), a phenyl group, a haloalkyl group, an aminoalkyl group, a hydrocarbon oxy group, and a halo hydrocarbon oxy group comprising halogen and oxygen atoms separated by at least two carbon atoms.

Specific examples of this PPE include poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether) and further include polyphenylene ether copolymers such as copolymers of 2,6-dimethylphenol and other phenols (e.g., 2,3,6-trimethylphenol and 2-methyl-6-butylphenol). Among others, the PPE is, preferably, poly(2,6-dimethyl-1,4-phenylene ether) or a copolymer of 2,6-dimethylphenol and 2,3,6-trimethylphenol, more preferably, poly(2,6-dimethyl-1,4-phenylene ether).

A method for producing the PPE may be any method known in the art without particular limitations. The PPE can be produced easily by, for example, a method by Hay described in U.S. Pat. No. 3,306,874 comprising subjecting, for example, 2,6-xylenol to oxidation polymerization using a complex of a cuprous salt and amine as catalysts and by other methods such as methods described in U.S. Pat. Nos. 3,306,875, 3,257,357, and 3,257,358, JP-B-52-17880, JP-A-50-51197, and JP-A-63-152628.

The polyphenylene ether resin as the component (b) used in the present invention may be used in a form of 100% by weight of the PPE component. However, the polyphenylene ether resin that can be used preferably in the present invention is composed at a ratio of PPE/styrene resin=1 to 99% by weight/99 to 1% by weight. Among others, the PPE/styrene resin ratio used is most preferably a 80/20 to 20/80 ratio (unit: % by weight) from the viewpoint of improving the processability of the resin composition of the present invention also comprising the talc having an average particle size of 30 to 100 μm as the component (d) and the fibrous filler as the component (e) described later.

Examples of the styrene resin include a homopolymer of a styrene compound, a copolymer of two or more styrene compounds, and a rubber denatured styrene resin (high impact polystyrene) comprising rubber-like polymers dispersed in a particle form in a matrix comprising a polymer of a styrene compound. Examples of the styrene compound that produces these polymers include styrene, o-methylstyrene, p-methylstyrene, m-methylstyrene, α-methylstyrene, ethylstyrene, α-methyl-p-methylstyrene, 2,4-dimethylstyrene, monochlorostyrene, and p-tert-butylstyrene.

The styrene resin may be a copolymer obtained by using two or more of these styrene compounds in combination and is, particularly preferably, polystyrene obtained by polymerizing styrene alone. Polystyrene having a stereoregular structure, such as atactic polystyrene and syndiotactic polystyrene can be utilized effectively as these polymers.

The styrene resin used in combination with this PPE does not include: styrene copolymers serving as the compatibilizer as the component (c) shown below, such as a styrene-glycidyl methacrylate copolymer, a styrene-glycidyl methacrylate-methyl methacrylate copolymer, a styrene-glycidyl methacrylate-acrylonitrile copolymer, a styrene-vinyloxazoline copolymer, and a styrene-vinyloxazoline-acrylonitrile copolymer; and the component (f) such as styrene-butadiene block copolymers typified by a block copolymer obtained by copolymerizing a vinyl aromatic compound and a conjugated diene compound and a hydrogenated block copolymer obtained by further subjecting this block copolymer to hydrogenation reaction or hydrogenated block copolymers as hydrogenated products of the styrene-butadiene block copolymers.

The resin composition of the present invention comprises 45 to 99 parts by weight of the polyphenylene sulfide resin (a) and 55 to 1 part(s) by weight of the polyphenylene ether resin (b) as a ratio of the polyphenylene sulfide resin as the component (a) to the polyphenylene ether resin as the component (b) formulated. The polyphenylene ether resin as the component (b) must be contained at a proportion of 1 part by weight or higher. The polyphenylene ether resin contained at a proportion of 55 parts by weight or lower can largely suppress the occurrence of burrs during molding and produces a resin composition excellent in processability, in heat resistance, and in a balance between tenacity (impact strength) and rigidity. The most preferable form of the polyphenylene sulfide resin as the component (a), when used, is the combined use of the linear polyphenylene sulfide resin (a-1)/the cross-linked polyphenylene sulfide resin (a-2). A ratio of the linear polyphenylene sulfide resin (a-1)/the cross-linked polyphenylene sulfide resin (a-2) formulated can be selected from among 1 to 96% by weight/99 to 4% by weight and is particularly preferably 10 to 90% by weight/90 to 10% by weight, more preferably 15 to 80% by weight/85 to 20% by weight. The linear polyphenylene sulfide resin (a-1) must be contained at a proportion of 1% by weight or higher in the polyphenylene sulfide resin as the component (a). The linear polyphenylene sulfide resin (a-1) contained at a proportion of 96% by weight or lower produces a resin composition excellent in a balance between tenacity (impact strength) and rigidity.

Next, the compatibilizer used as the component (c) of the present invention acts as an emulsification-dispersing agent for mixing the polyphenylene sulfide resin as the component (a) and the polyphenylene ether resin as the component (b). The compatibilizer significantly reduces the occurrence of burrs in a molded product obtained by molding the resin composition of the present invention and produces effects excellent in a balance between tenacity (impact strength) and rigidity.

Examples of the compatibilizer as the component (c) include (1) an epoxy resin, (2) a silane coupling agent, and (3) an epoxy group-containing compound and/or an oxazolyl group-containing compound. Among others, a copolymer of an unsaturated monomer having an epoxy group and/or an oxazolyl group and a monomer mainly composed of styrene can be utilized more preferably.

In this context, a monomer mainly composed of styrene, which comprises 100% by weight of the styrene component, can be utilized without problems. However, when other monomers copolymerizable with styrene are present therein, the copolymer chain thereof must contain at least 65% by weight or higher, more preferably 75 to 95% by weight of the styrene repeating unit from the viewpoint of maintaining miscibility with the polyphenylene ether resin as the component (b). Specific examples thereof include a copolymer of an unsaturated monomer having an epoxy group and/or an oxazolyl group and a styrene monomer and a copolymer of an unsaturated monomer having an epoxy group and/or an oxazolyl group and styrene/acrylonitrile=90 to 75% by weight/10 to 25% by weight.

Examples of the epoxy group-containing unsaturated monomer include glycidyl methacrylate, glycidyl acrylate, vinyl glycidyl ether, glycidyl ether of hydroxyalkyl (meth) acrylate, glycidyl ether of polyalkylene glycol (meth)acrylate, and glycidyl itaconate. Glycidyl methacrylate is particularly preferable. As the oxazolyl group-containing unsaturated monomer, for example, 2-isopropenyl-2-oxazoline is industrially available and can be used preferably.

Examples of other unsaturated monomers copolymerizable with these unsaturated monomers having an epoxy group and/or an oxazolyl group include vinyl aromatic compounds such as styrene as an essential component as well as copolymerizable components such as vinyl cyanide monomers (e.g., acrylonitrile), vinyl acetate, and (meth)acrylic ester. In the present invention, the component except for the unsaturated monomer having an epoxy group and/or an oxazolyl group must contain at least 65% by weight of the styrene monomer. Moreover, the copolymer as the component (c) must contain 0.3 to 20% by weight, preferably 1 to 15% by weight, more preferably 3 to 10% by weight of the unsaturated monomer having an epoxy group and/or an oxazolyl group.

The amount of the unsaturated monomer having an epoxy group and/or an oxazolyl group in the copolymer as the component (c) must be 0.3% by weight or higher. The unsaturated monomer contained at a proportion of 20% by weight or lower produces the excellent miscibility between the polyphenylene sulfide resin as the component (a) and the polyphenylene ether resin as the component (b). The unsaturated monomer contained at this proportion can largely suppress the occurrence of burrs in a molded product formed with the resin composition obtained therefrom and produces effects excellent in a balance between tenacity (impact strength) and rigidity.

Examples of the copolymer as the component (c) obtained by copolymerizing these copolymerizable unsaturated monomers include a styrene-glycidyl methacrylate copolymer, a styrene-glycidyl methacrylate-methyl methacrylate copolymer, a styrene-glycidyl methacrylate-acrylonitrile copolymer, a styrene-vinyloxazoline copolymer, and a styrene-vinyloxazoline-acrylonitrile copolymer.

The amount of the compatibilizer as the component (c) formulated must be 1 to 20 part(s) by weight, preferably 2 to 15 parts by weight, more preferably 3 to 10 parts by weight, with respect to 100 parts by weight in total of the components (a) and (b). The component (c) formulated in an amount of 1 part by weight or higher produces the excellent miscibility between the polyphenylene sulfide resin as the component (a) and the polyphenylene ether resin as the component (b). The component (c) formulated in an amount of 20 parts by weight or lower can largely suppress the occurrence of burrs in a molded product formed with the resin composition obtained therefrom and produces effects excellent in a balance between tenacity (impact strength) and rigidity.

Next, the talc having an average particle size of 25 to 100 µm used as the component (d) of the present invention is generally mainly composed of hydrous magnesium silicate ($SiO_2$: 58 to 64%, MgO: 28 to 32%, $Al_2O_3$: 0.5 to 5%, $Fe_2O_3$: 0.3 to 5%). For producing effects excellent in a balance between tenacity (impact strength) and rigidity in the composition of the present invention, the talc (d) has an average particle size much larger than that of a talc usually used in resin modification and has an average particle size of 25 to 100 µm, preferably 25 to 70 µm, more preferably 25 to 50 µm. Furthermore, the talc as the component (d) is, preferably, a plate-like crystalline talc containing 70% or more of particles having a size of 10 µm or larger. The average particle size in the present invention is a d50 particle size (median size). This average particle size is a value measured by a laser diffraction method and can be determined, for example, by measurement using a mixed solution of 30% by volume of ethanol/70% by volume of pure water by a laser diffraction method using a Shimadzu particle size distribution analyzer SALD-2000A model manufactured by Shimadzu Corp. Furthermore, the content of particles having a size of 10 µm or larger is a value measured by the laser diffraction method and can be determined by this method.

This talc as the component (d) may further be treated with a surface treatment agent such as a silane coupling agent, a titanate coupling agent, or an aliphatic metal salt, converted into an organic matter by treatment with an ammonium salt or the like according to an intercalation method, or treated with a resin such as an urethane or epoxy resin as a binder.

When this talc as the component (d) is used alone, the amount of the talc as the component (d) formulated is 20 to 200 parts by weight, preferably 30 to 150 parts by weight, more preferably 30 to 100 parts by weight, with respect to 100 parts by weight in total of the components (a) and (b). The component (d) formulated in an amount of 20 parts by weight or higher can enhance a balance between tenacity (impact strength) and rigidity of the resin composition obtained therefrom. The component (d) formulated in an amount of 200 parts by weight or lower can produce a resin composition excellent in heat resistance.

The fibrous filler as the component (e) that can be used in combination with the talc having an average particle size of 25 to 100 µm used as the component (d) of the present invention produces effects that can more highly enhance heat resistance and a balance between tenacity (impact strength) and rigidity than the use of the talc as the component (d) alone. This fibrous filler that can be used as the component (e) can be at least one member selected from the group consisting of a glass fiber, a carbon fiber, a carbon nanotube, an alumina fiber, a silicon carbide fiber, a ceramic fiber, a gypsum fiber, a metal fiber, potassium titanate whisker, calcium carbonate whisker, and wollastonite. These fibrous fillers may further be treated with a surface treatment agent such as a silane coupling agent, a titanate coupling agent, or an aliphatic metal salt or treated with a resin such as an urethane or epoxy resin as a binder.

The total amount of the fibrous filler as the component (e) formulated in combination with the talc as the component (d) is 20 to 200 parts by weight, preferably 30 to 150 parts by weight, more preferably 30 to 100 parts by weight, with respect to 100 parts by weight in total of the components (a) and (b). The talc as the component (d) and the fibrous filler as the component (e) formulated in a total amount of 20 parts by weight or higher can enhance a balance between tenacity (impact strength) and rigidity of the resin composition obtained therefrom. The talc as the component (d) and the fibrous filler as the component (e) formulated in a total amount of 200 parts by weight or lower can produce a resin composition excellent in heat resistance. A ratio of the talc as the component (d) to the fibrous filler as the component (e) formulated, when used in combination, can be selected arbitrarily for use from among 1/99 to 99/1 (by weight).

Next, the impact resistance-imparting agent used as the component (f) of the present invention can usually be formulated in the resin composition for the purpose of imparting impact strength thereto. Examples of the impact resistance-imparting agent that can be used include: a block copolymer obtained by copolymerizing a vinyl aromatic compound and a conjugated diene compound; a hydrogenated block copolymer obtained by further subjecting this block copolymer to hydrogenation reaction; a block copolymer comprising the block copolymer or the hydrogenated block copolymer to which at least one functional group selected from hydroxyl, carboxyl, acid anhydride, ester, epoxy, oxazolyl, and amino groups is added; an ethylene/α-olefin copolymer; a functional group-supplemented copolymer obtained by graft-reacting this ethylene/α-olefin copolymer with an unsaturated compound having at least one functional group selected from hydroxyl, carboxyl, acid anhydride, ester, epoxy, oxazolyl, and amino groups in the presence or absence of a radical initiator; and a functional group-containing copolymer obtained by copolymerizing ethylene and/or other α-olefins with a functional group-containing unsaturated compound having at least one functional group selected from hydroxyl, carboxyl, acid anhydride, ester, epoxy, oxazolyl, and amino groups. At least one of these impact resistance-imparting agents can be selected according to the purpose and used as the impact resistance-imparting agent as the component (f) of the present invention.

The amount of this impact resistance-imparting agent as the component (f) formulated is 5 to 30 parts by weight, preferably 5 to 20 parts by weight, more preferably 10 to 20 parts by weight, with respect to 100 parts by weight in total of the components (a) and (b). The component (f) formulated in an amount of 5 parts by weight or higher produces high heat resistance and improved tenacity (e.g., impact strength) in a molded product formed with the resin composition obtained therefrom. The component (f) formulated in an amount of 30 parts by weight or lower can produce an excellent balance between tenacity (impact strength) and rigidity in a molded product formed with the resin composition obtained therefrom.

A method for producing the resin composition of the present invention may be any method. Among others, a resin composition obtained through a particular production method shown below is most preferable for producing the effects of the present invention.

Specifically, the most preferable production method is as follows:

A method for producing a resin composition comprising 45 to 99 parts by weight of a polyphenylene sulfide resin (a) comprising 1 to 96% by weight of a linear polyphenylene sulfide resin (a-1) and 99 to 4% by weight of a cross-linked polyphenylene sulfide resin (a-2), 55 to 1 part(s) by weight of a polyphenylene ether resin (b), 1 to 20 part(s) by weight of a compatibilizer (c) with respect to 100 parts by weight in total of the components (a) and (b), 20 to 200 parts by weight of a talc (d) having an average particle size of 25 to 100 μm or 20 to 200 parts by weight in total of a talc (d) having an average particle size of 25 to 100 μm and a fibrous filler (e) with respect to 100 parts by weight in total of the components (a) and (b), comprising the steps of:

(1) at a first stage of heat melt-kneading, heat melt-kneading at least 30% by weight, preferably 40% by weight, more preferably 50% by weight of the linear polyphenylene sulfide resin (a-1) contained in the polyphenylene sulfide resin, with the whole amount of the compatibilizer as the component (c) under conditions that satisfy the whole amount of the polyphenylene ether resin as the component (b)/the amount of the polyphenylene sulfide resin as the component (a)=70/30 (by weight) or less, preferably 55/45 or less, with a heat melt-kneader (which includes heat melt-kneaders such as monoaxial extruders, biaxial extruders, rolls, kneaders, Brabender Plastograph, and Banbury mixers; a melt-kneading method using a biaxial extruder is particularly preferable) set to at a temperature of 280 to 350° C. to obtain a first melt-kneaded product;

(2) next, adding the remaining amount of the polyphenylene sulfide resin as the component (a) in the presence of the first melt-kneaded product (which may be in a melt or unmelted state) obtained at the step (1) and heat melt-kneading the mixture with a heat melt-kneader (which includes heat melt-kneaders such as monoaxial extruders, biaxial extruders, rolls, kneaders, Brabender Plastograph, and Banbury mixers; a melt-kneading method using a biaxial extruder is particularly preferable) set to at a temperature of 280 to 350° C.; and (3) adding the talc as the component (d) or the talc as the component (d)+the fibrous filler as the component (e) in the presence of the heat melt-kneaded resin composition (which may be in a melt or unmelted state) comprising the components (a) to (c) at or after the above step (2) and heat melt-kneading the mixture with a heat melt-kneader (which includes heat melt-kneaders such as monoaxial extruders, biaxial extruders, rolls, kneaders, Brabender Plastograph, and Banbury mixers; a melt-kneading method using a biaxial extruder is particularly preferable) set to at a temperature of 280 to 350° C.

A method for producing the resin composition further comprising the impact resistance-imparting agent as the component (f) of the present invention can comprise adding the impact resistance-imparting agent as the component (f) together with the components (a) to (c) at the above step (1) for producing the first melt-kneaded product in the method described above.

In the present invention, stabilizers (e.g., a heat stabilizer, an antioxidant, and an UV absorbent), a crystalline nucleus agent, a conductivity-imparting agent, an anti-static agent, a flame retardant, a coloring agent (e.g., a pigment or a dye), and a mold release agent (e.g., polyethylene wax, polypropylene wax, montanate wax, or stearate wax) known in the art can optionally be added appropriately, in addition to the above components, to the resin composition without impairing the characteristics and effects of the present invention.

The resin composition of the present invention thus obtained is available as a molding material for a precision molded product and can be subjected to molding methods such as injection molding, metal in-mold molding, outsert molding, blow molding, extrusion molding, sheet molding, film molding, heat press molding, rotating molding, and lamination molding.

The molded products obtained by these molding methods can be used widely as a mechanical component for an optical instrument, a peripheral component for a light source lamp, an optical fiber connector ferrule, a printer component, a copy machine component, an internal component of an automobile engine room (e.g., an automobile radiator tank component), and an automobile lamp component.

EXAMPLES

Hereinafter, the present invention will be described with reference to Examples.

Raw materials used are as follows:

Linear polyphenylene sulfide resin as component (a-1)

Linear polyphenylene sulfide resins shown below were obtained according to Example 1 of JP-A-8-253587.

(a-1-1): a p-phenylene sulfide repeating unit-containing linear PPS having a melt viscosity (value measured with a flow tester after 6-minute retention at 300° C. under conditions involving a load of 196 N and L/D=10/1) of 500 poise, an extractability with methylene chloride of 0.4% by weight, and an —SX group content of 26 µmol/g.

(a-1-2): a p-phenylene sulfide repeating unit-containing linear PPS having a melt viscosity of 300 poise measured in the same way as in the component (a-1-1), an extractability with methylene chloride of 0.7% by weight, and an —SX group content of 32 µmol/g.

Cross-linked polyphenylene sulfide resin as component (a-2)

(a-2-1): a cross-linked PPS (K-2 manufactured by DIC EP Inc.) having a melt viscosity (value measured with a flow tester after 6-minute retention at 300° C. under conditions involving a load of 196 N and L/D=10/1) of 500 poise and a volatile matter content of 160 ppm.

(a-2-2): a cross-linked PPS (M2900 manufactured by Toray Industries, Inc.) having a melt viscosity of 500 poise measured in the same way as in the component (a-2-1) and a volatile matter content of 1,200 ppm.

Polyphenylene ether resin as component (b)

(b-1): polyphenylene ether having a number-average molecular weight of 24,000 in terms of polystyrene measured by GPC (gel permeation chromatography), which was prepared by the oxidation polymerization of 2,6-xylenol.

(b-2): polyphenylene ether having a number-average molecular weight of 9,600 in terms of polystyrene measured by GPC (gel permeation chromatography), which was prepared by the oxidation polymerization of 2,6-xylenol.

(b-3): a polyphenylene ether resin prepared by dry-blending (simply mixing without heat melting) the polyphenylene ether (b-1)/atactic polystyrene (Polystyrene 685 manufactured by PS Japan)=60/40 (by weight).

Additive as component (c)

(c-1): a styrene-glycidyl methacrylate copolymer having a weight-average molecular weight of 110,000 containing 5% by weight of glycidyl methacrylate.

(c-2): a styrene-2-isopropenyl-2-oxazoline copolymer having a weight-average molecular weight of 146,000 containing 5% by weight of 2-isopropenyl-2-oxazoline.

Talc as component (d)

(d-1): a talc (Talc SP-38 manufactured by Fuji Talc Industrial Co., Ltd.) containing 92.4% of particles having a size of 10 µm or larger and an average particle size of 39.5 µm determined by a laser diffraction method using a Shimadzu particle size distribution analyzer SALD-2000A model manufactured by Shimadzu Corp.

(d-2): a talc containing 90.8% of particles having a size of 10 µm or larger and an average particle size of 30.2 µm determined by a laser diffraction method using a Shimadzu particle size distribution analyzer SALD-2000A model manufactured by Shimadzu Corp.

(d-3): a talc containing 66.3% of particles having a size of 10 µm or larger and an average particle size of 28.7 µm determined by a laser diffraction method using a Shimadzu particle size distribution analyzer SALD-2000A model manufactured by Shimadzu Corp.

(d-4): a talc (Talc SP-40 manufactured by Fuji Talc Industrial Co., Ltd.) containing 86.0% of particles having a size of 10 µm or larger and an average particle size of 19.9 µm determined by a laser diffraction method using a Shimadzu particle size distribution analyzer SALD-2000A model manufactured by Shimadzu Corp.

(d-5): a talc (Talc PKP-80 manufactured by Fuji Talc Industrial Co., Ltd.) containing 73.4% of particles having a size of 10 µm or larger and an average particle size of 14.5 µm determined by a laser diffraction method using a Shimadzu particle size distribution analyzer SALD-2000A model manufactured by Shimadzu Corp.

(d-6): a mica (Suzorite Mica 200HK manufactured by Kuraray Co., Ltd.) having an average particle size of 75 µm determined by a laser diffraction method using a Shimadzu particle size distribution analyzer SALD-2000A model manufactured by Shimadzu Corp.

(d-7): a mica (Suzorite Mica 325HK manufactured by Kuraray Co., Ltd.) having an average particle size of 20 µm determined by a laser diffraction method using a Shimadzu particle size distribution analyzer SALD-2000A model manufactured by Shimadzu Corp.

(d-8): calcium carbonate (Sunlight SL-100 manufactured by Takehara Kagaku Kogyo Co., Ltd.) having an average particle size of 6.2 µm determined by a laser diffraction method using a Shimadzu particle size distribution analyzer SALD-2000A model manufactured by Shimadzu Corp.

Fibrous filler as component (e)

(e-1): a glass fiber having an average diameter of 13 µm and a length of 3 mm surface-treated with an amino silane coupling agent and further treated with an epoxy resin as a binder.

Impact resistance-imparting agent as component (f)

(f-1): a hydrogenated block copolymer with a bound styrene content of 47%, a 1,2-vinyl bond amount of 48% in a polybutadiene moiety, a number-average molecular weight of a polystyrene chain of 19,000, and a hydrogenation rate of the polybutadiene moiety of 99.8%, having a polystyrene block-hydrogenated polybutadiene-polystyrene block structure.

(f-2): a hydrogenated block copolymer with a bound styrene content of 35%, a 1,2-vinyl bond amount of 55% in a polybutadiene moiety, a number-average molecular weight of a polystyrene chain of 43,000, and a hydrogenation rate of the polybutadiene moiety of 99.2%, having a polystyrene block-hydrogenated polybutadiene-polystyrene block structure.

Molded products formed with resin compositions obtained from these components were evaluated as follows:

(Deflection Temperature Under Load)

Each resin composition was supplied to an in-line screw injection molding machine set to at 290 to 310° C. The test piece was molded under conditions of a die temperature of 130° C. The DTUL (deflection temperature under load) thereof was measured according to ASTM D-648 (1.82 MPa load).

(Impact Strength)

Each resin composition was supplied to an in-line screw injection molding machine set to at 290 to 310° C. The test piece was molded under conditions of a die temperature of 130° C. The Izod impact strength (⅛ inch in thickness, with notch) thereof was measured according to ASTM D-256 (measurement temperature of 23° C.)

(Flexural Modulus: Rigidity)

Each resin composition was supplied to an in-line screw injection molding machine set to at 290 to 310° C. The test piece was molded under conditions of a die temperature of 130° C. The flexural modulus thereof was measured according to ASTM D-790 (measurement temperature of 23° C.).
(Die Wear Resistance)

Each resin composition was supplied to an in-line screw injection molding machine set to at 290 to 310° C. The test piece was molded at consecutive 500 shots in a die comprising an ASTM #1 dumbbell test piece gate portion nested in aluminum under conditions of a die temperature of 130° C. Then, the die wear resistance thereof was evaluated on the basis of weight reduction after molding with the aluminum nest.

Examples 1 to 10 and Comparative Examples 1 to 9

A biaxial extruder (ZSK-40 manufactured by COPERION WERNER & PFLEIDERER, German) was set to at a temperature of 290 to 310° C. and a screw rotating speed of 300 rpm. The components (a-1), (a-2), (b), (c), and (f) were supplied at composition proportions described in Tables 1 and 2 from a first raw material supply port of the extruder. The mixture was heat melt-kneaded. The components (a-2), (d), and (e) were further supplied at composition proportions described in Tables 1 and 2 from downstream second and third raw material supply ports of the extruder in the presence of the heat melt-kneaded product. The mixture was further heat melt-kneaded to produce a resin composition in a pellet form.

The pellet thus obtained was used and supplied to an in-line screw injection molding machine set to at 290 to 310° C. Test pieces for measurement of deflection temperature under load (DTUL), for Izod impact measurement, and for flexural modulus measurement were injection-molded under conditions of a die temperature of 130° C. Moreover, die wear resistance measurement was performed with an aluminum nest die under the same molding conditions.

Next, these test pieces were used to measure the deflection temperature under load (DTUL) (according to ASTM D-648: 1.82 MPa load), the Izod (⅛ inch in thickness, with notch) impact strength (according to ASTM D-256; a measurement temperature of 23° C.), and the flexural modulus (according to ASTM D-638; a measurement temperature of 23° C.). These results are also shown in Tables 1 and 2.

These results showed that the use of a talc having a particle size of 25 μm or larger as a talc formulated in a resin composition comprising a polyphenylene sulfide resin and a polyphenylene ether resin produces a resin composition more excellent in a balance between tenacity (impact strength) and rigidity than the use of a talc having a particle size of less than 25 μm. Furthermore, the use of a talc having a particle size of 25 μm or larger as a talc formulated in a system using both a linear polyphenylene sulfide resin and a cross-linked polyphenylene sulfide resin also produces a resin composition more excellent in a balance between tenacity (impact strength) and rigidity than the use of a talc having a particle size of less than 25 μm. The combined use of a linear polyphenylene sulfide resin and a cross-linked polyphenylene sulfide resin as a polyphenylene sulfide resin provides a resin composition further improved in impact strength.

It was also shown that the use of the specific talc of the present invention as a plate-like inorganic filler formulated in a resin composition comprising a polyphenylene sulfide resin and a polyphenylene ether resin produces a resin composition significantly excellent in die wear resistance.

Particularly, a resin composition obtained by the particular production method described above with the linear polyphenylene sulfide as the component (a-1), the cross-linked polyphenylene sulfide resin as the component (a-2), the polyphenylene ether resin as the component (b), and the compatibilizer as the component (c) is remarkably excellent in a balance between tenacity (impact strength) and rigidity and in die wear resistance.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| Supply of first raw material | Component (a) | a-2-1 | a-2-1 | a-2-2 | a-2-1 | a-2-2 | a-1-1 | a-1-1 | a-1-2 | a-2-1 | a-1-2 | a-1-1 | a-1-2 |
| | Amount of component (a) formulated (part by weight) | 36 | 36 | 36 | 36 | 36 | 36 | 11 | 11 | 24 | 7 | 11 | 11 |
| | Component (b) | b-1 | b-1 | b-1 | b-1 | b-1 | b-1 | b-1 | b-2 | b-3 | b-3 | b-1 | b-2 |
| | Amount of component (b) formulated (part by weight) | 24 | 24 | 24 | 24 | 24 | 24 | 24 | 24 | 16 | 16 | 24 | 24 |
| | Component (c) | c-1 | c-2 | c-1 | c-2 | c-1 | c-1 | c-1 | c-2 | c-1 | c-1 | c-1 | c-2 |
| | Amount of component (c) formulated (part by weight) | 1.8 | 1.8 | 1.8 | 1.8 | 1.8 | 1.8 | 1.8 | 1.8 | 1.8 | 1.8 | 1.8 | 1.8 |
| | Component (f) | — | — | — | — | — | — | — | — | — | — | f-1 | f-2 |
| | Amount of component (f) formulated (part by weight) | — | — | — | — | — | — | — | — | — | — | 10 | 10 |
| Supply of second raw material | Component (a) | — | — | — | — | — | — | a-2-1 | a-2-1 | — | a-2-1 | a-2-1 | a-2-1 |
| | Amount of component (a) formulated (part by weight) | — | — | — | — | — | — | 25 | 25 | — | 17 | 25 | 25 |
| | Component (d) | d-1 | d-2 | d-3 | d-1 | d-1 | d-1 | d-1 | d-1 | d-1 | d-1 | d-1 | d-1 |
| | Amount of component (d) formulated (part by weight) | 20 | 20 | 20 | 20 | 20 | 20 | 20 | 20 | 30 | 30 | 20 | 20 |
| Supply of third raw material | Component (e) | e-1 | e-1 | e-1 | e-1 | e-1 | e-1 | e-1 | e-1 | e-1 | e-1 | e-1 | e-1 |
| | Amount of component (e) formulated (part by weight) | 20 | 20 | 20 | 20 | 20 | 20 | 20 | 20 | 30 | 30 | 20 | 20 |
| Physical property | DTUL (° C.) | 216 | 215 | 211 | 215 | 210 | 206 | 211 | 209 | 217 | 214 | 210 | 207 |
| | Impact strength (J/m) | 36 | 34 | 29 | 34 | 35 | 49 | 46 | 42 | 35 | 40 | 55 | 53 |
| | Tensile strength (Mpa) | 82 | 83 | 73 | 83 | 81 | 79 | 80 | 76 | 74 | 73 | 81 | 79 |
| Die wear resistance: 500 shots (mg) | | 2.5 | 2.3 | 2.4 | | | | | | | | | |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
| Supply of first raw material | Component (a) | a-2-1 | a-2-1 | a-1-1 | a-2-2 | a-2-1 | a-2-1 | a-2-1 | a-2-1 | a-2-1 |
|  | Amount of component (a) formulated (part by weight) | 36 | 36 | 36 | 36 | 24 | 24 | 36 | 36 | 36 |
|  | Component (b) | b-1 | b-1 | b-1 | b-1 | b-3 | b-3 | b-1 | b-1 | b-1 |
|  | Amount of component (b) formulated (part by weight) | 24 | 24 | 24 | 24 | 16 | 16 | 24 | 24 | 24 |
|  | Component (c) | c-1 | c-1 | c-1 | c-1 | c-1 | c-1 | c-1 | c-1 | c-1 |
|  | Amount of component (c) formulated (part by weight) | 1.8 | 1.8 | 1.8 | 1.8 | 1.8 | 1.8 | 1.8 | 1.8 | 1.8 |
|  | Component (f) | — | — | — | — | — | — | — | — | — |
|  | Amount of component (f) formulated (part by weight) | — | — | — | — | — | — | — | — | — |
| Supply of second raw material | Component (a) | — | — | — | — | — | — | — | — | — |
|  | Amount of component (a) formulated (part by weight) | — | — | — | — | — | — | — | — | — |
|  | Component (d) | d-4 | d-5 | d-5 | d-4 | d-4 | d-5 | d-6 | d-7 | d-8 |
|  | Amount of component (d) formulated (part by weight) | 20 | 20 | 20 | 20 | 30 | 30 | 20 | 20 | 20 |
| Supply of third raw material | Component (e) | e-1 | e-1 | e-1 | e-1 | e-1 | e-1 | e-1 | e-1 | e-1 |
|  | Amount of component (e) formulated (part by weight) | 20 | 20 | 20 | 20 | 30 | 30 | 20 | 20 | 20 |
| Physical property | DTUL (° C.) | 205 | 203 | 189 | 200 | 204 | 203 | 212 | 188 | 178 |
|  | Impact strength (J/m) | 21 | 16 | 43 | 19 | 22 | 21 | 17 | 14 | 31 |
|  | Tensile strength (Mpa) | 72 | 68 | 70 | 74 | 52 | 49 | 74 | 67 | 78 |
| Die wear resistance: 500 shots (mg) |  | 2.5 | 2.3 |  |  |  |  | 46.5 | 7.1 | 0.9 |

The resin composition of the present invention is excellent in heat resistance and in a balance between tenacity (impact strength) and mechanical strength and as such, can be utilized as at least one component for molded products such as chassis or cabinet (e.g., a compact disc read-only memory (CDROM), a digital versatile disc read-only memory (DVDROM), a compact disc recordable (CDR), a digital versatile disc recordable, −R specification (DVD-R), a digital versatile disc recordable, +R specification (DVD+R), a compact disc rewritable (CDRW), a digital versatile disc rewritable, −R specification (DVD-RW), a digital versatile disc rewritable, +R specification (DVD+RW), and a digital versatile disc random access memory (DVDRAM)), a mechanical component for an optical instrument (e.g., a slide base for optical pickup), a peripheral component for a light source lamp, an optical fiber connector ferrule, an internal component for a laser beam printer, an internal component for a ink-jet printer, an internal component for a copy machine, an internal component of an automobile engine room (e.g., an automobile radiator tank component), and an automobile lamp component.

The invention claimed is:

1. A resin composition comprising 45 to 99 parts by weight of a polyphenylene sulfide resin (a), 55 to 1 part(s) by weight of a polyphenylene ether resin (b), 1 to 20 part(s) by weight of a compatibilizer (c) with respect to 100 parts by weight in total of the components (a) and (b), and 20 to 200 parts by weight of a talc (d) having an average particle size of 25 to 100 μm or 20 to 200 parts by weight in total of a talc (d) having an average particle size of 25 to 100 μm and a fibrous filler (e) with respect to 100 parts by weight in total of the components (a) and (b), wherein said talc (d) has a scaly form;
wherein the talc having an average particle size of 25 to 100 μm as the component (d) is a talc containing 70% or more of particles having a size of 10 μm or larger.

2. The resin composition according to claim 1, wherein the polyphenylene sulfide resin as the component (a) is a linear polyphenylene sulfide resin (a-1) and/or a cross-linked polyphenylene sulfide resin (a-2).

3. The resin composition according to claim 1, wherein the polyphenylene sulfide resin as the component (a) comprises 1 to 96% by weight of the linear polyphenylene sulfide resin (a-1) and 99 to 4% by weight of the cross-linked polyphenylene sulfide resin (a-2).

4. The resin composition according to claim 1, wherein the resin composition further comprises 5 to 30 parts by weight of an impact resistance-imparting agent (f) with respect to 100 parts by weight in total of the components (a) and (b).

5. The resin composition according to claim 1, wherein the polyphenylene sulfide resin as the component (a) has a melt viscosity of 1 to 10,000 poise.

6. The resin composition according to claim 1, wherein the linear polyphenylene sulfide resin as the component (a-1) has an extractability with methylene chloride of 0.7% by weight or lower and has 20 μmol/g or more of a -SX group, where S represents a sulfur atom, and X represents an alkali metal or hydrogen atom.

7. The resin composition according to claim 1, wherein the cross-linked polyphenylene sulfide resin as the component (a-2) has a volatile matter content of 1,000 ppm or lower collected in a melt state at 320° C.

8. The resin composition according to claim 1, wherein the polyphenylene ether resin as the component (b) has any one component ratio of polyphenylene ether=100% by weight or polyphenylene ether/styrene resin=1 to 99% by weight.

9. The resin composition according to claim 1, wherein the compatibilizer as the component (c) is at least one member selected from the group consisting of a styrene-glycidyl methacrylate copolymer, a styrene-glycidyl methacrylate-methyl methacrylate copolymer, a styrene-glycidyl methacrylate-acrylonitrile copolymer, a styrene-vinyloxazoline copolymer, and a styrene-vinyloxazoline-acrylonitrile copolymer.

10. The resin composition according to claim 1, wherein the talc as the component (d) is a talc having an average particle size of 25 to 70 μm.

11. The resin composition according to claim 1, wherein the fibrous filler as the component (e) is at least one member selected from the group consisting of a glass fiber, a carbon fiber, a carbon nanotube, an alumina fiber, a silicon carbide fiber, a ceramic fiber, a gypsum fiber, a metal fiber, potassium titanate whisker, calcium carbonate whisker, and wollastonite.

12. The resin composition according to claim 1, wherein the impact resistance-imparting agent as the component (f) is at least one member selected from the group consisting of: a block copolymer obtained by copolymerizing a vinyl aromatic compound and a conjugated diene compound; a hydrogenated block copolymer obtained by further subjecting this block copolymer to hydrogenation reaction; a block copolymer comprising the block copolymer or the hydrogenated block copolymer and having at least one functional group selected from hydroxyl, carboxyl, acid anhydride, ester, epoxy, oxazolyl, and amino groups; an ethylene/α-olefin copolymer; and a copolymer comprising this ethylene/α-olefin copolymer and having at least one functional group selected from hydroxyl, carboxyl, acid anhydride, ester, epoxy, oxazolyl, and amino groups.

13. The resin composition according to claim 1, wherein the resin composition is used in at least one molded component selected from a mechanical component for an optical instrument, a peripheral component for a light source lamp, an optical fiber connector ferrule, a printer component, a copy machine component, an automobile lamp component, an automobile radiator tank component, and an internal component of an automobile engine room.

* * * * *